Jan. 18, 1949.   J. I. ELLMANN   2,459,510
ALTERNATING CURRENT SOLENOID
RECIPROCATING MOTOR UNIT
Filed Dec. 26, 1947   2 Sheets-Sheet 1
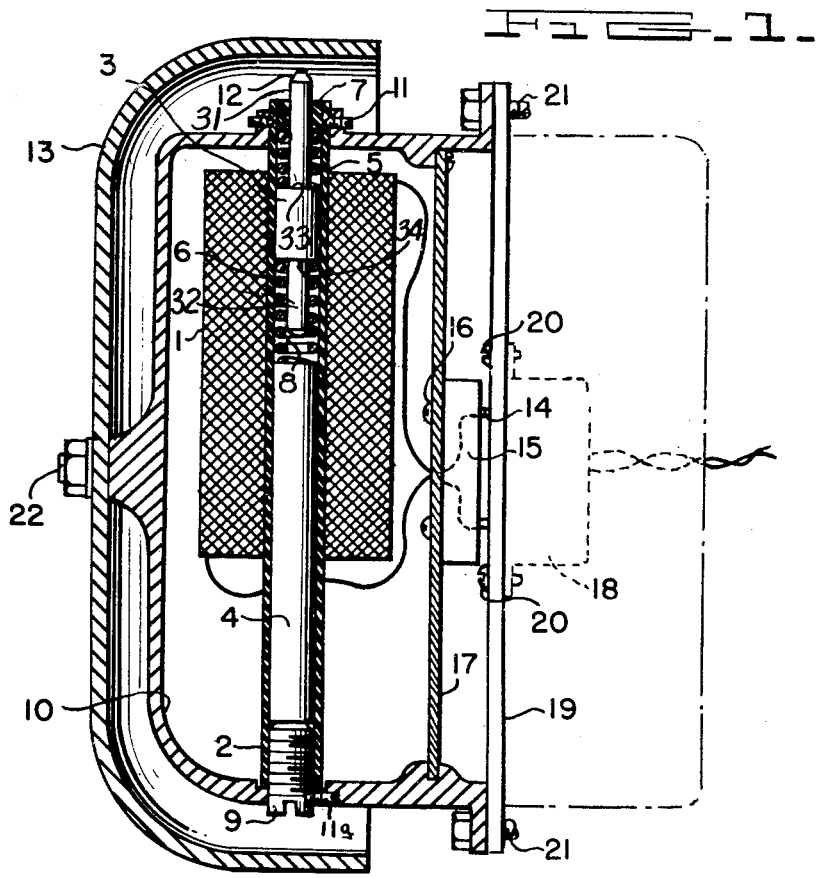
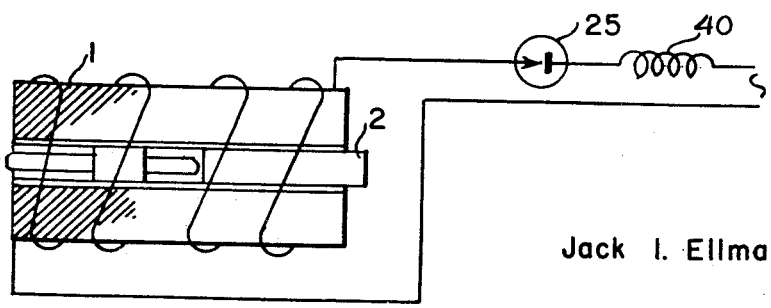
Inventor
Jack I. Ellmann
By Adams + Bush
Attorneys

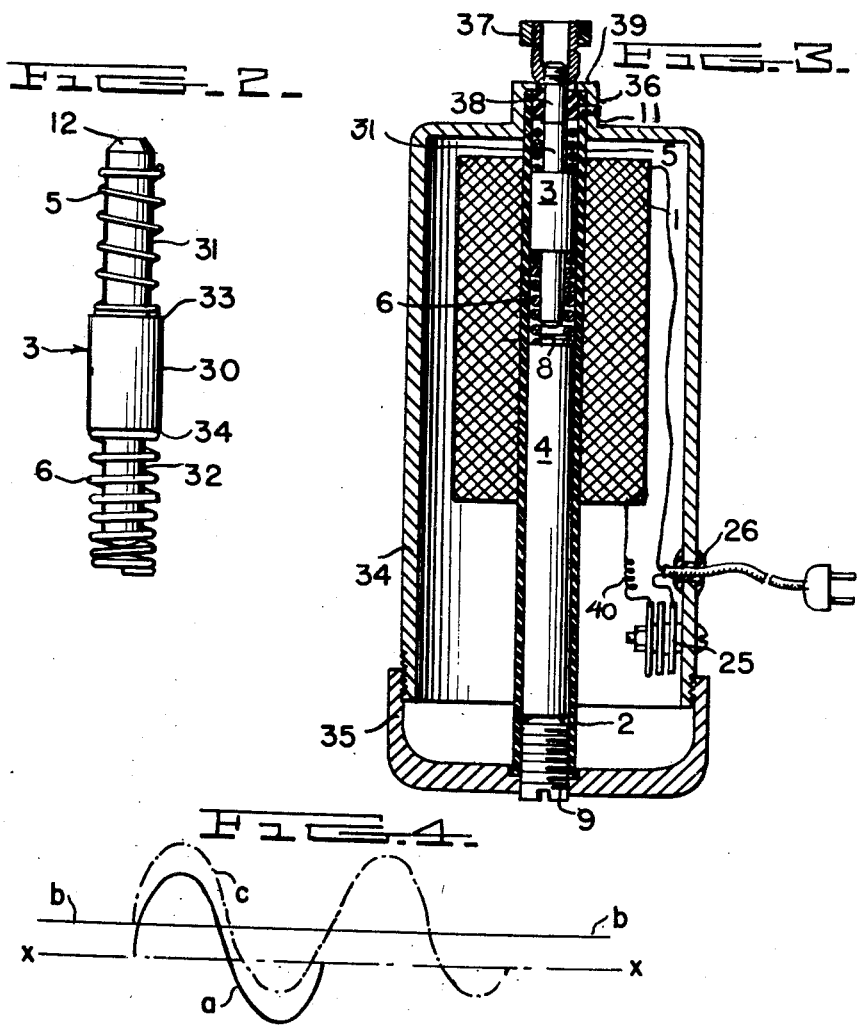
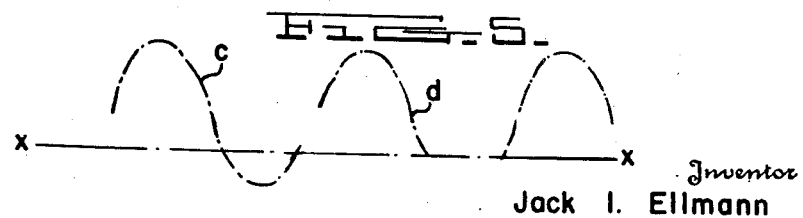

Patented Jan. 18, 1949

2,459,510

UNITED STATES PATENT OFFICE 2,459,510

ALTERNATING CURRENT SOLENOID RECIPROCATING MOTOR UNIT

Jack I. Ellmann, Washington, D. C.

Application December 26, 1947, Serial No. 793,960

12 Claims. (Cl. 172—126)

My invention relates to a motor unit to produce reciprocating movement when energized by alternating current as of commercial frequency, and, in particular, to such a motor unit in which the desired actuating magnetic field is obtained by using, in cooperation with the magnetic field due to an alternating current applied to the winding of a solenoid, a permanent magnet of high remanence and coercive power positioned axially within the winding sleeve of the solenoid as a core.

Heretofore, in alternating current reciprocating motor units, it has been usual to insert a half-wave rectifier connected in series in the alternating current supply leads of the winding of the solenoid, to produce a pulsating current of one polarity which passes through the solenoid winding and causes it to vibrate its core. The rectifier is placed outside of the solenoid and increases substantially the bulk of the unit, and commercially available contact half-wave rectifiers are often subject to failure in operation.

Efforts have also been made to obtain polarization of the magnetic field by applying a powerful permanent magnet to superpose a concentrated field on the alternating magnetic field of the solenoid, but such permanent magnets which have been used have been bulky and heavy and massive magnets mounted outside of the solenoid, since it has been found that the types of permanent magnets which have been placed within the central core tube of the solenoid have been quickly demagnetized by the alternating field of the solenoid.

An object of my invention is to provide a reciprocating electric motor unit operating directly on alternating current supply of commercial frequency.

Another object of my invention is to translate alternating current electrical energy of commercial frequency into reciprocating mechanical movement of the same frequency.

A further object of my invention is to provide an electric bell operating on alternating current of commercial frequency.

Still another object of my invention is to provide an improved pulsating motor which operates on alternating current of commercial frequency and is capable of operating reciprocating, percussion and vibratory tools or devices.

Yet another object of my invention is to provide a solenoid with an axially translatable core which will operate satisfactorily on alternating current.

A further object of my invention is to provide a solenoid with axially displaceable core which will operate on alternating current without the use of a rectifier in the solenoid supply line.

A still further object of my invention is to provide a solenoid unit which will operate on alternating current wherein all auxiliary permanent magnets are relatively small in dimensions but powerful, and are contained within the core tube of the solenoid.

Yet a further object of my invention is to provide an alternating current solenoid employing a permanent magnet within the core tube which is not subject to demagnetization by the alternating field of the solenoid.

My invention is applicable to ringing bells using alternating current at ordinary commercial frequencies, and to operating vibratory power tools from the same supply, and to various other devices employing vibratory and reciprocating motion.

My invention provides compactness and positiveness of action which is not found in devices heretofore available.

My invention will be understood from the following specification and the accompanying drawings, wherein like characters of reference represent corresponding parts in the several figures, and wherein:

Fig. 1 shows the details of my vibratory device and solenoid applied to ring a bell;

Fig. 2 is a detailed view showing the soft iron movable plunger with its shoulders, and its springs in place;

Fig. 3 shows my vibratory device applied to drive a tool chuck for a percussive tool;

Fig. 4 shows curves illustrating the effective magnetic field within the solenoid sleeve and acting on the movable soft iron plunger, and shows the change in the field as a function of time due to the addition of the permanent magnet;

Fig. 5 shows curves corresponding to those of Fig. 4, but with the addition of a rectifier in series with the solenoid winding, as may be used, for instance, with the tool chuck; and Fig. 6 is a circuit diagram showing a rectifier in series with the solenoid winding, as employed, for instance, with the tool chuck of Fig. 3.

Referring to the drawings in detail, a solenoid 1 has a central axial aperture in its winding spool through which there passes the tube 2 which is preferably circular and which is formed of non-magnetic material such as molded resinous plastic. Tube 2 may also be square or of other cross-section. The tube 2 has, at one end, a shoulder or collar 7 which may be formed integrally with the tube 2, or attached thereto, and the collar 7 is provided with a central aperture of reduced size. A soft iron plunger member 3 has a central shank portion 30 which has a sliding fit within tube 2, and has, at its respective ends, tip portions 31, 32, of somewhat reduced diameter forming shoulders 33, 34. A helical spring 5 surrounds reduced tip 31 and bears against collar 7 and shoulder 33, tending to urge plunger 3 downward. A cylindrical permanent magnet 4 is slidably fitted in the tube 2, whereby it may be axially adjusted by an adjusting screw 9 which threadedly engages an aperture in housing 10. A set screw 11—a locks adjusting screw 9 in position, and set screws 11, 11, at the other end of tube 2 pass through a boss on the housing and holds tube 2 in position in housing 10, preferably made of non-magnetic material such as aluminum or a suitable plastic. A non-magnetic tip 12 is carried on the end of reduced portion 31 of plunger 3.

The spring 6 which bears against shoulder 34 of plunger 3, and against one end of permanent magnet 4, tends to hold the free end of reduced portion 32 urged upwardly away from permanent magnet 4 and spaced therefrom by an air gap 8.

The permanent magnet 4 is a straight rod and relatively short and of circular or other cross section to fit in tube 2, and is made of a highly retentive magnetic material of high coercive power, such as one of the alloys known as alnico, such as the alloy described in U. S. Patent No. 2,264,038, which contains 6% to 12% of titanium, 30% to 36% cobalt, 3.6% to 9.6% aluminum, 16% to 25% nickel, and the remainder iron, and has a coercive force of 1053 and a residual of 5680. This permanent magnet must have sufficiently great remanence and sufficiently great coercive power so that it will not be demagnetized by the alternating magnetic field produced by the solenoid. The permanent magnet must be of sufficient strength to produce in air gap 8 a field nearly as strong as the peak value of the alternating magnetic field due to the alternating voltage alone applied to the solenoid. The use for permanent magnet 4 of such material as mentioned, such as Alnico, makes it possible to obtain in a cylindrical bar magnet of relatively small dimensions, a sufficiently powerful permanent magnetic field to satisfactorily oppose one half of the alternating cycle.

The air gap is preferably located substantially at the center of the solenoid coil with the lower portion of the plunger 3 and the upper portion of the permanent magnet 4 within the confines of the solenoid coil. To prevent the magnetic field of the solenoid from de-magnetizing the permanent magnet, it is desirable that at least a major portion of the permanent magnet be outside the coil. In the example shown, about one third of the length of this magnet is within the coil.

In practice, I find that good results are attained by making spring 6 about ten times stronger than spring 5. For use with a large bell, it is satisfactory to use a spring 6 which will be compressed about one-sixteenth of an inch under an applied force of ten pounds.

For use with a large bell gong, such as a 10 inch gong, typical dimensions of the solenoid are 1½ inches diameter and 2¾ inches long, having 10,000 turns, and pulling one-tenth ampere at 110 volts. Typical dimensions of soft iron core 3 are, diameter of shank 30 is ⅜ inch, length of shank 30 is ½ inch, length of restricted portion 31 is ¾ inch, length of restricted portion 32 is ⅝ inch. Typical dimensions of permanent magnet bar 4, are ⅜ inch diameter and 3 inches long.

When the solenoid is not energized, the air gap between the end of the restricted portion 32 and the adjacent end of permanent magnet 4 should be at least ⅛ inch. These dimensions are simply representative of those satisfactory for the purpose mentioned, and structures of other dimensions may be used.

A bell shell or gong 13 is mounted on housing 10 by bolt 22 and has a portion which is struck by the tip 12 of plunger 3 as plunger 3 vibrates or reciprocates.

The helical spring 5 is relatively light. The helical spring 6 is much stronger than spring 5, and is preferably formed of non-magnetic material.

A plate 17 is secured to the sides of housing 10, and an insulated plug 15 having blades 14, 14, is connected to the terminals of the winding of solenoid 1.

The cover plate 19 closes the one side of housing 10 and carries a male connector having blades 14, 14, and is connected to an external source of commercial alternating current. When cover plate 19 is applied tightly against housing 10 by screwing up fastening bolts 21, the terminals 14, 14 will be engaged by the receptacle 18 and apply alternating voltage to the solenoid winding.

The percussive tool application shown in Fig. 3, employs structural elements which are substantially the same as those of Fig. 1, particularly as to the assembly of tube 2, plunger 3 and permanent magnet 4. In Fig. 3, the reduced portion 31 of plunger 3 has a relatively long non-magnetic tip 38, which is terminally threaded to receive in threaded relation a threaded bore of tool chuck 37.

Housing 34 is closed at its lower end by cover 35 which is apertured and threaded to receive adjusting screw 9. The upper end of housing 10 has a lug 36 through which pass set screws 11 to hold tube 2 in place, and also has a terminal shoulder 39 against which the end of tube 2 bears, and through which terminal shoulder the tip 38 of plunger 3 reciprocates.

A half-wave rectifier 25, such as a stack of selenium rectifier elements, may be connected in series in the alternating current supply circuit of the winding of the solenoid 1, when considerable amounts of power are required, as in the application to percussion tools. By substantially entirely eliminating the amount of force applied in the reverse direction by the magnetic field, the total integrated value of the power applied in the desired direction over a given interval is substantially increased. The alternating current input leads from a commercial alternating current source pass through a bushing 26 in casing 34 to the rectifier, and then to the solenoid winding.

Fig. 6 shows the series circuit connection of rectifier 25 with the actuating winding of solenoid 1.

Fig. 4 illustrates as a function of time the effect on the instantaneous magnetic field within the central portion of the solenoid spool, due to the presence of permanent magnet 4, which produces satisfactory striking of the bell in the application of Fig. 1. The curve $a$ shows a sine wave of the magnetic field along the time axis $x$—$x$ due to the alternating voltage applied to the solenoid winding, with no permanent magnet present. The magnitude of the permanent, unidirectional magnetic field due to the presence of permanent magnet 4 is shown equal to the constant distance $xb$, where $bb$ represents this permanent magnetic field as a function of time, the time axis being shown at $xx$. The magnetic field within the solenoid core which is applied to movable soft iron core 3, as in air gap 8, is the resultant of the alternating magnetic field shown as curve $a$, and the permanent magnet field $bb$. This resultant field is shown in Fig. 4, as curve $c$, and results in shifting the zero axis of the alternating magnetic field upwards from axis $xx$ by the value $xb$, clipping off most of the second half of each cycle of the alternating field, giving a unidirectional pulsating field, which when integrated over an interval of time gives a much greater force available to urge the plunger 3 in one direction in tube 2, than in the other direction. Thus, the two magnetic fields are additive in the first half cycle and are opposed in the second half cycle. This force is ample to satisfactorily ring the bell or perform similar work.

When tasks requiring more power are to be performed and the half-wave rectifier 25 is inserted in series in the alternating current supply of the solenoid winding, the rectifier cuts out practically all of the second half of each cycle, which, when integrated, further increases substantially the power available to urge the plunger 3 in the impacting direction. Fig. 5 shows the curve $d$ of the magnetic field in air gap 8 obtained using the rectifier 25. This curve $d$ is the same as the resultant curve $c$ of Fig. 4, but with the second half of each cycle practically entirely cut out.

The unit without the half-wave rectifier will, however, satisfactorily produce impacts of entirely adequate power and characteristics for most applications, due to the employment of a permanent magnet of the described characteristics, positioned in the solenoid bore.

In operation, alternating current energy, as of 60 cycle frequency, is applied to the winding of the solenoid, and causes in the solenoid bore a pulsating magnetic field, as shown in the first half-cycle of curve $c$ of Fig. 4, consisting of the positive half of the alternating magnetic field added to the permanent magnet field. This resultant field pulls the plunger 3 down into the bore of the solenoid, and compresses the heavy spring 6. During the second half of the cycle of curve $c$ (Fig. 4), where the permanent magnet field reduces the negative half of the alternating magnetic field nearly to zero, the spring 6, in recoiling, instantly urges plunger 3 back upwardly so that its tip 12 strikes the bell gong 13 a quick blow, and light spring 6 is compressed, whereupon the plunger 3 is again retracted into the solenoid bore by the first half of the next cycle, and its downward motion is accelerated by the recoil action of the light spring 5. The cycle then repeats.

The operation of the percussive tool device, as shown in Fig. 3, is practically the same as just described, except that the upward recoil of plunger 3, during the second half of the cycle, is more abrupt and stronger, because during the second half of the cycle the resultant magnetic field in the air gap in the solenoid bore is reduced practically to zero.

The solenoid unit of my invention is positive in action and convenient for use, because it employs alternating current of commercial frequency, and because units can be made very compactly to produce considerable power, due to the employment of the highly coercive permanent magnet entirely contained within the bore of the solenoid.

It will be apparent to those skilled in the art that my invention is susceptible of modifications to meet particular applications and conditions, and all such modifications which are within the scope of the appended claims, I consider to be comprehended within the spirit of my invention.

What I claim is:

1. In an alternating current reciprocating motor unit, a solenoid having an axial bore and an internal non-magnetic sleeve received in said bore, a permanent magnet projecting within said sleeve, a soft iron core also within said sleeve, a first resilient means interposed between said permanent magnet and said soft iron core, the soft iron core being axially displaceable in said sleeve and being provided with an axial extension extending to the exterior of said sleeve, the end of said sleeve through which said extension projects being provided with apertured retaining means, a second resilient means surrounding said extension and bearing against said retaining means and a portion of the said soft iron core nearest the end of said sleeve through which the extension projects, holding means for fixing the permanent magnet in position in the other end of said tube, said permanent magnet being substantially entirely contained within said sleeve, whereby energization of the winding of said solenoid by alternating current causes reciprocating movement of said axially displaceable core.

2. A motor unit according to claim 1, said first resilient means having much greater stiffness than said second resilient means.

3. A motor unit according to claim 1, said first resilient means being non-magnetic.

4. A motor unit according to claim 1, said first resilient means having much greater stiffness than said second resilient means, and the coercive power of said permanent magnet being so determined with reference to the stiffness of said resilient means and the tractive pull of said solenoid when energized by said alternating current that said displaceable core is reciprocated at the frequency of the alternating current applied to said solenoid winding.

5. A motor unit according to claim 1, said permanent magnet having a coercive force of the order of 1053 oersteds and a residual of the order of 5680 gausses.

6. A motor unit according to claim 1, said permanent magnet being an alloy of very high coercive power and remanence of the type containing 6% to 12% titanium, 16% to 25% nickel, 30% to 36% cobalt, 3.6% to 9.6% aluminum, and the remainder iron.

7. A motor unit according to claim 1, said permanent magnet core being at the second end of said sleeve and being of substantially greater axial length than said soft iron core with at least a substantial portion of its length outside the solenoid.

8. A motor unit according to claim 1, said soft iron core being at the said first end of said sleeve, and its said extension being of substantially reduced diameter, said retaining means being an apertured shoulder on said first end of said sleeve.

9. A motor unit according to claim 1, a source of alternating current, and connections extending between said source and the terminals of the winding of said solenoid, said connections comprising a half-wave rectifier.

10. A motor unit according to claim 1, said permanent magnet core being entirely contained and slidably adjustable within the bore of said tube.

11. An alternating current reciprocating unit comprising, in combination, a housing, a solenoid mounted within the housing and having an axial bore, a tube of non-magnetic material extending through the solenoid and secured to the housing; a soft iron plunger slidably mounted in one end of the tube and having a portion projecting beyond the housing with another portion arranged within the solenoid coil; said plunger having reduced extremities to provide stop shoulders, a collar fixed in the upper end of said tube also providing a stop shoulder, the outer extremity of said plunger projecting through said collar; a light spring mounted on the outermost and reduced extremity of said plunger and exerting spring pressure thereon inwardly of the solenoid bore; a permanent magnet slidably mounted in the opposite end of said tube and spaced from the inner extremity of the soft iron core; a relatively strong spring mounted between the permanent magnet and the shoulder provided by the inner extremity of the soft iron core and exerting outward pressure on the plunger; and an adjusting screw at the outer end of the permanent magnet to adjust the air gap between the inner end of the soft iron core and the inner end of the permanent magnet.

12. In an alternating current reciprocating motor of the class described, a housing; a substantially cylindrical solenoid mounted within the housing; a non-magnetic tube mounted in the housing and extending through the solenoid; a soft iron core confined within the upper end of the tube and having its lower end partially surrounded by the solenoid and its upper end projecting above the housing; a permanent magnet bar of high coercive force mounted in the lower end portion of the tube with its upper end spaced from the lower end of the soft iron core; a pair of springs acting in opposite directions on the soft iron core with the lower spring much stronger than the upper spring; and means for adjusting the permanent magnet to vary the reluctance of the air gap between the upper end of the permanent magnet and the lower end of the soft iron core.

JACK I. ELLMANN.

REFERENCES CITED

The following references are of record in the file of this patent:

UNITED STATES PATENTS

| Number | Name | Date |
| --- | --- | --- |
| 1,768,718 | Soderberg | July 1, 1930 |
| 1,904,955 | Schouten | Apr. 18, 1933 |
| 2,357,743 | Kenerson | Sept. 5, 1944 |